United States Patent
Ichikawa et al.

(10) Patent No.: US 8,854,011 B2
(45) Date of Patent: Oct. 7, 2014

(54) VEHICLE CHARGING APPARATUS FOR CHARGING A POWER STORAGE DEVICE MOUNTED ON A VEHICLE

(75) Inventors: Shinji Ichikawa, Toyota (JP); Kazuyoshi Takada, Kariya (JP); Shimpei Sakoda, Kariya (JP)

(73) Assignees: Toyota Jidosha Kabushiki Kaisha, Toyota (JP); Kabushiki Kaisha Toyota Jidoshokki, Kariya-shi (JP)

( * ) Notice: Subject to any disclaimer, the term of this patent is extended or adjusted under 35 U.S.C. 154(b) by 444 days.

(21) Appl. No.: 13/319,579

(22) PCT Filed: May 14, 2009

(86) PCT No.: PCT/JP2009/058978
§ 371 (c)(1),
(2), (4) Date: Dec. 8, 2011

(87) PCT Pub. No.: WO2010/131348
PCT Pub. Date: Nov. 18, 2010

(65) Prior Publication Data
US 2012/0306439 A1  Dec. 6, 2012

(51) Int. Cl.
*H01M 10/46*  (2006.01)
*B60L 11/12*  (2006.01)
*B60L 11/14*  (2006.01)
*B60L 11/18*  (2006.01)

(52) U.S. Cl.
CPC ............. *B60L 11/14* (2013.01); *Y02T 10/6217* (2013.01); *B60L 11/123* (2013.01); *Y02T 90/14* (2013.01); *Y02T 10/7088* (2013.01); *Y02T 90/122* (2013.01); *B60L 2220/14* (2013.01); *Y02T 10/7005* (2013.01); *Y02T 90/121* (2013.01); *B60L 11/1812* (2013.01); *Y02T 10/7077* (2013.01); *Y02T 90/127* (2013.01); *B60L 11/1816* (2013.01); *B60L 11/182* (2013.01); *Y02T 10/7022* (2013.01)
USPC .......................................................... 320/138

(58) Field of Classification Search
USPC .......... 320/107, 108, 114, 115, 132, 137, 138
See application file for complete search history.

(56) References Cited

U.S. PATENT DOCUMENTS 6,160,374 A  12/2000  Hayes et al.
6,239,577 B1  5/2001  Koike et al.
(Continued)

FOREIGN PATENT DOCUMENTS

AU  2006269374 B2  1/2007
AU  2006269374 C1  1/2007
(Continued)

OTHER PUBLICATIONS

International Search Report issued in International Application No. PCT/JP2009/058978 dated Aug. 11, 2009 (with translation).

*Primary Examiner* — Edward Tso
(74) *Attorney, Agent, or Firm* — Oliff PLC

(57) ABSTRACT

A vehicle includes a power reception terminal, a charger and a non-contact power reception unit. The power reception terminal is configured to be electrically connectable to an AC power supply. The charger is configured to convert AC electric power inputted from the power reception terminal to a predetermined DC voltage. The non-contact power reception unit is configured to be magnetically coupled to a power transmission unit of an AC power supply to receive electric power from the AC power supply in a non-contact manner. The non-contact power reception unit is connected to a power conversion circuit of the charger.

10 Claims, 15 Drawing Sheets

(56) References Cited

U.S. PATENT DOCUMENTS

| | | |
|---|---|---|
| 7,741,734 B2 | 6/2010 | Joannopoulos et al. |
| 8,478,469 B2 * | 7/2013 | Ueo et al. ................ 701/22 |
| 2007/0222542 A1 | 9/2007 | Joannopoulos et al. |
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0264745 A1 | 10/2010 | Karalis et al. |
| 2040/0253152 | 10/2010 | Karalis et al. |
| 2010/0299008 A1 | 11/2010 | Mitsutani |
| 2012/0217111 A1 * | 8/2012 | Boys et al. ................ 191/10 |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | A-11-252810 | 9/1999 |
| JP | A-2001-103685 | 4/2001 |
| JP | A-2003-47163 | 2/2003 |
| JP | A-2008-220130 | 9/2008 |
| JP | A-2000-341887 | 12/2008 |
| JP | A-2009-501510 | 1/2009 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |
| WO | WO 2009/034878 A1 | 3/2009 |
| WO | WO 2009/054221 A1 | 4/2009 |

* cited by examiner

VEHICLE CHARGING APPARATUS FOR CHARGING A POWER STORAGE DEVICE MOUNTED ON A VEHICLE

TECHNICAL FIELD

The present invention relates to a vehicle charging apparatus, and particularly to a vehicle charging apparatus for charging a power storage device mounted on a vehicle by an AC power supply external to the vehicle.

BACKGROUND ART

Japanese Patent Laying-Open No. 2008-220130 (PTL 1) discloses a power supply system for a vehicle capable of charging a power storage unit such as a secondary battery and an electric double layer capacitor by a power supply external to the vehicle. This power supply system for a vehicle includes: conductive charging means for charging (conductively charging) the power storage unit by receiving and transmitting electric power with the power supply system electrically connected to the power supply external to the vehicle; inductive charging means for charging (inductively charging) the power storage unit by receiving and transmitting electric power with the power supply system magnetically coupled to the power supply external to the vehicle; and a charging control device selecting either the conductive charging means or the inductive charging means.

According to this power supply system for a vehicle, a selection can be made between conductive charging with the conductive charging means and inductive charging with the inductive charging means to charge the power storage unit, and thus, an area where the power storage unit can be charged can be expanded (see PTL 1).

CITATION LIST

Patent Literature

PTL 1: Japanese Patent Laying-Open No. 2008-220130
PTL 2: Japanese Patent Laying-Open No. 2003-47163

SUMMARY OF INVENTION

Technical Problem

The power supply system for a vehicle disclosed in above-mentioned Japanese Patent Laying-Open No. 2008-220130 is useful because the area where the power storage unit can be charged can be expanded. However, separately providing a charger for the conductive charging method (so-called plug-in method) and a charger for the inductive charging method (non-contact method) in the vehicle leads to an increase in cost of the vehicle. Therefore, in the system as described above, how to suppress the increase in cost is an important task.

Thus, an object of the present invention is to provide a vehicle charging apparatus that allows both conductive charging (plug-in charging) and inductive charging (non-contact charging) and can suppress an increase in cost.

Solution to Problem

According to the present invention, a vehicle charging apparatus is a vehicle charging apparatus for charging a power storage device mounted on a vehicle by an AC power supply external to the vehicle, including: a power reception terminal, a charger and a non-contact power reception unit. The power reception terminal is configured to be electrically connectable to the AC power supply. The charger is configured to convert AC electric power inputted from the power reception terminal to a predetermined DC voltage. The non-contact power reception unit is configured to be magnetically coupled to a power transmission unit of the AC power supply to receive electric power from the AC power supply in a non-contact manner. The non-contact power reception unit is connected to a power conversion circuit of the charger.

Preferably, the charger includes first and second rectification units, an inverter and an insulating transformer. The first rectification unit is configured to be capable of rectifying the AC electric power inputted from the power reception terminal. The inverter is connected to the first rectification unit. The insulating transformer is connected to the inverter. The second rectification unit is configured to rectify an output of the insulating transformer. The non-contact power reception unit is connected to either the first rectification unit or the second rectification unit.

More preferably, one rectification unit of the first and second rectification units is formed of a rectification element having more excellent high-frequency rectification property than that of a rectification element constituting the other rectification unit. The non-contact power reception unit is connected to the one rectification unit.

In addition, preferably, the non-contact power reception unit is connected to the second rectification unit. The vehicle charging apparatus further includes a voltage conversion device. The voltage conversion device is provided between the non-contact power reception unit and the second rectification unit.

Preferably, the charger includes first and second rectification units, an inverter and an insulating transformer. The first rectification unit is configured to be capable of rectifying the AC electric power inputted from the power reception terminal. The inverter is connected to the first rectification unit. The insulating transformer is connected to the inverter. The second rectification unit is configured to rectify an output of the insulating transformer. The non-contact power reception unit includes a power reception coil and a third rectification unit. The power reception coil is configured to be magnetically coupled to a power transmission coil provided at the power transmission unit. The third rectification unit is configured to rectify an output of the power reception coil. The third rectification unit is connected between the first rectification unit and the inverter.

In addition, preferably, the charger includes first and second rectification units, an inverter and an insulating transformer. The first rectification unit is configured to be capable of rectifying the AC electric power inputted from the power reception terminal. The inverter is connected to the first rectification unit. The insulating transformer is connected to the inverter. The second rectification unit is configured to rectify an output of the insulating transformer. The non-contact power reception unit includes a power reception coil and a third rectification unit. The power reception coil is configured to be magnetically coupled to a power transmission coil provided at the power transmission unit. The third rectification unit is configured to rectify an output of the power reception coil. The second rectification unit includes first and second upper-and-lower arms. The first and second upper-and-lower arms are connected in parallel between a positive electrode output line and a negative electrode output line of the charger. Each arm of the first upper-and-lower arm includes a switching element. A secondary coil of the insulating transformer is connected between an intermediate point of the first upperand-lower arm and an intermediate point of the second upper-and-lower arm. The charger further includes a reactor. The reactor is connected between the intermediate point of the first upper-and-lower arm and the positive electrode output line. The third rectification unit is connected to the positive electrode output line and the negative electrode output line of the charger.

In addition, preferably, the charger includes first and second rectification units, an inverter and an insulating transformer. The first rectification unit is configured to be capable of rectifying the AC electric power inputted from the power reception terminal. The inverter is connected to the first rectification unit. The insulating transformer is connected to the inverter. The second rectification unit is configured to rectify an output of the insulating transformer. The non-contact power reception unit includes a power reception coil and a third rectification unit. The power reception coil is configured to be magnetically coupled to a power transmission coil provided at the power transmission unit. The third rectification unit is configured to rectify an output of the power reception coil. The second rectification unit includes first and second upper-and-lower arms. The first and second upper-and-lower arms are connected in parallel between a positive electrode output line and a negative electrode output line of the charger. Each arm of the first upper-and-lower arm includes a switching element. A secondary coil of the insulating transformer is connected between an intermediate point of the first upper-and-lower arm and an intermediate point of the second upper-and-lower arm. The charger further includes a reactor. The reactor is connected between one output end of the third rectification unit and the intermediate point of the first upper-and-lower arm. The other output end of the third rectification unit is connected to the negative electrode output line of the charger.

In addition, preferably, the charger includes first and second rectification units, an inverter and an insulating transformer. The first rectification unit is configured to be capable of rectifying the AC electric power inputted from the power reception terminal. The inverter is connected to the first rectification unit. The insulating transformer is connected to the inverter. The second rectification unit is configured to rectify an output of the insulating transformer. The non-contact power reception unit includes a power reception coil and a third rectification unit. The power reception coil is configured to be magnetically coupled to a power transmission coil provided at the power transmission unit. The third rectification unit is configured to rectify an output of the power reception coil. The second rectification unit includes first and second upper-and-lower arms. The first and second upper-and-lower arms are connected in parallel between a positive electrode output line and a negative electrode output line of the charger. Each arm of the first upper-and-lower arm includes a switching element. A secondary coil of the insulating transformer is connected between an intermediate point of the first upper-and-lower arm and an intermediate point of the second upper-and-lower arm. The third rectification unit is connected to the positive electrode output line and the negative electrode output line of the charger. The charger further includes a switching device. The switching device breaks electrical connection between the secondary coil of the insulating transformer and the intermediate point of the second upper-and-lower arm, and electrically connects the secondary coil to the positive electrode output line, when the non-contact power reception unit is used for charging.

In addition, preferably, the charger includes first and second rectification units, an inverter and an insulating transformer. The first rectification unit is configured to be capable of rectifying the AC electric power inputted from the power reception terminal. The inverter is connected to the first rectification unit. The insulating transformer is connected to the inverter. The second rectification unit is configured to rectify an output of the insulating transformer. The non-contact power reception unit includes a power reception coil and a third rectification unit. The power reception coil is configured to be magnetically coupled to a power transmission coil provided at the power transmission unit. The third rectification unit is configured to rectify an output of the power reception coil. The second rectification unit includes first and second upper-and-lower arms. The first and second upper-and-lower arms are connected in parallel between a positive electrode output line and a negative electrode output line of the charger. Each arm of the first upper-and-lower arm includes a switching element. A secondary coil of the insulating transformer is connected between an intermediate point of the first upper-and-lower arm and an intermediate point of the second upper-and-lower arm. The charger further includes a switching device. The switching device breaks electrical connection between the secondary coil of the insulating transformer and the intermediate point of the second upper-and-lower arm, and electrically connects the secondary coil to one output end of the third rectification unit, when the non-contact power reception unit is used for charging. The other output end of the third rectification unit is connected to the negative electrode output line of the charger.

Preferably, the non-contact power reception unit further includes an electromagnetic shielding material. The electromagnetic shielding material integrally shields the power reception coil and the third rectification unit from electromagnetic waves.

Advantageous Effects of Invention

In this vehicle charging apparatus, conductive charging during which the power reception terminal receives the AC electric power supplied from the AC power supply external to the vehicle and inductive charging during which the non-contact power reception unit receives the AC electric power are possible. Since the non-contact power reception unit is connected to the power conversion circuit of the charger, at least a part of power elements constituting the power conversion circuit are used both at the time of conductive charging and at the time of inductive charging. As a result, the number of components can be reduced as compared with the case where a charger for conductive charging and a charger for inductive charging are provided separately.

Therefore, according to this vehicle charging apparatus, both conductive charging (plug-in charging) and inductive charging (non-contact charging) are possible while suppressing an increase in cost.

DESCRIPTION OF EMBODIMENTS

Figure 1:
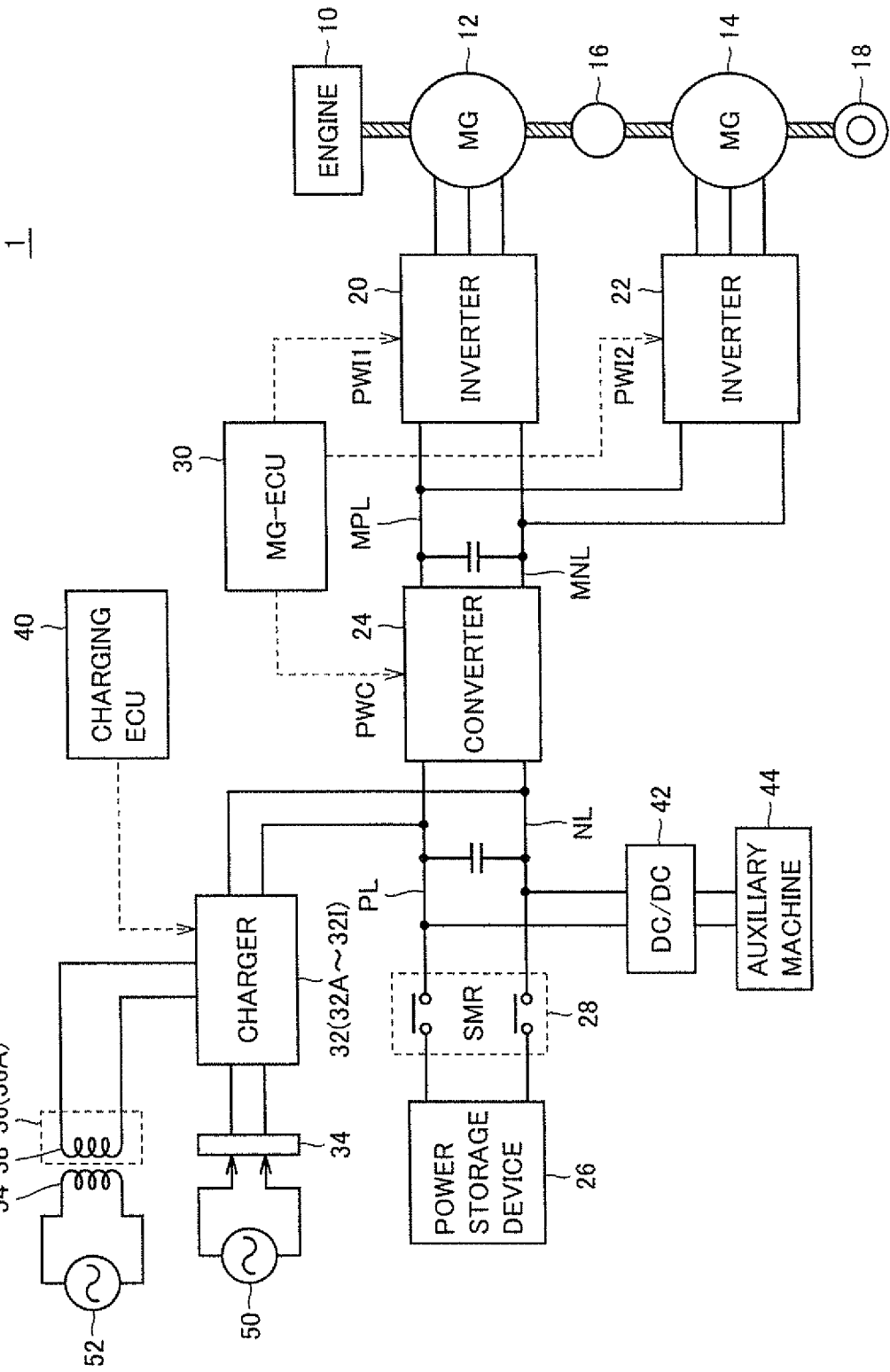
FIG. 1 is an overall configuration diagram of a vehicle to which a vehicle charging apparatus according to a first embodiment of the present invention is applied.

Embodiments of the present invention will be described in detail hereinafter with reference to the drawings, in which the same or corresponding portions are denoted with the same reference characters and a description thereof will not be repeated.

First Embodiment

FIG. 1 is an overall configuration diagram of a vehicle to which a vehicle charging apparatus according to a first embodiment of the present invention is applied. Referring to FIG. 1, a vehicle 1 includes an engine 10, motor generators 12 and 14, a power split device 16, and a driving wheel 18. Vehicle 1 further includes inverters 20 and 22, a converter 24, a power storage device 26, a system main relay (SMR) 28, and an MG-ECU (Electronic Control Unit) 30. Vehicle 1 further includes a charger 32, a power reception terminal 34, a non-contact power reception unit 36, and a charging ECU 40. Vehicle 1 further includes a DC/DC converter 42 and an auxiliary machine 44.

Engine 10 is configured to be capable of converting thermal energy generated by combustion of fuel to kinetic energy of kinetic elements such as a piston and a rotor, and outputting the kinetic energy to power split device 16. Power split device 16 is configured to be capable of splitting the kinetic energy generated by engine 10 into motor generator 12 and driving wheel 18. For example, a planetary gear having three rotation shafts of a sun gear, a planetary carrier and a ring gear can be used as power split device 16, and these three rotation shafts are linked to a rotation shaft of motor generator 12, a crankshaft of engine 10 and a drive shaft (driving wheel 18) of the vehicle, respectively.

Motor generators 12 and 14 are each an AC motor and a three-phase AC synchronous motor having a permanent magnet embedded in a rotor, for example. Motor generator 12 has the rotation shaft linked to power split device 16 and is driven by inverter 20. Motor generator 12 receives the kinetic energy generated by engine 10 from power split device 16, converts the kinetic energy to electrical energy, and outputs the electrical energy to inverter 20. In addition, motor generator 12 generates driving force using three-phase AC electric power received from inverter 20, to start up engine 10.

Motor generator 14 has a rotation shaft linked to the drive shaft (driving wheel 18) of the vehicle. Motor generator 14 is driven by inverter 22 and generates driving torque of the vehicle using three-phase AC electric power received from inverter 22. In addition, at the time of braking the vehicle or at the time of reducing acceleration on a descending slope, motor generator 14 receives, from driving wheel 18, mechanical energy stored in the vehicle as kinetic energy or potential energy, converts the mechanical energy to electrical energy (regenerative electric power generation), and outputs the electrical energy to inverter 22.

Engine 10 is incorporated into vehicle 1 as a power source driving motor generator 12 and driving wheel 18. Motor generator 12 is incorporated into vehicle 1 operating as a generator driven by engine 10 and operating as a motor that can start up engine 10. Motor generator 14 is incorporated into vehicle 1 operating as a motor driving driving wheel 18 and operating as a generator capable of regenerative electric power generation using the mechanical energy stored in the vehicle.

Inverter 20 drives motor generator 12 based on a signal PWI1 from MG-ECU 30, and inverter 22 drives motor generator 14 based on a signal PWI2 from MG-ECU 30. Inverters 20 and 22 are connected to a main positive bus MPL and a main negative bus MNL, and each of inverters 20 and 22 is formed of, for example, a three-phase bridge circuit.

Inverter 20 drives motor generator 12 in a regenerative mode based on signal PWI1, converts electric power generated by motor generator 12 to DC electric power, and outputs the DC electric power to main positive bus MPL and main negative bus MNL. In addition, at the time of starting up engine 10, inverter 20 drives motor generator 12 in a power running mode based on signal PWI1, converts DC electric power supplied from main positive bus MPL and main negative bus MNL to AC electric power, and outputs the AC electric power to motor generator 12.

Inverter 22 drives motor generator 14 in the power running mode based on signal PWI2, converts DC electric power supplied from main positive bus MPL and main negative bus MNL to AC electric power, and outputs the AC electric power to motor generator 14. In addition, at the time of braking the vehicle or at the time of reducing acceleration on a descending slope, inverter 22 drives motor generator 14 in the regenerative mode based on signal PWI2, converts electric power generated by motor generator 14 to DC electric power, and outputs the DC electric power to main positive bus MPL and main negative bus MNL.

Converter 24 is connected between positive and negative electrode lines PL, NL and main positive and negative buses MPL, MNL. Converter 24 steps up a voltage between main positive bus MPL and main negative bus MNL to a voltage between positive electrode line PL and negative electrode line NL or a higher voltage, based on a signal PWC from MG-ECU 30. Converter 24 is formed of, for example, a step-up chopper circuit.

Power storage device 26 is a rechargeable DC power supply and is formed of, for example, a secondary battery such as a nickel-metal hydride secondary battery or a lithium ion secondary battery. Power storage device 26 is electrically connected to positive electrode line PL and negative electrode line NL by system main relay 28, and outputs electric power to positive electrode line PL and negative electrode line NL. In addition, power storage device 26 is charged by receiving electric power generated by at least one of motor generators 12 and 14 from converter 24. Furthermore, power storage device 26 is charged by receiving electric power supplied from AC power supply 50 or 52 external to the vehicle from charger 32. It is to be noted that a large-capacitance capacitor can also be used as power storage device 26.

System main relay 28 is provided between power storage device 26 and positive and negative electrode lines PL, NL, and is turned on at the time of starting up a vehicle system or at the time of charging power storage device 26 by AC power supply 50 (or 52).

Charger 32 is connected to positive electrode line PL and negative electrode line NL. Charger 32 receives AC electric power supplied from AC power supply 50 from power reception terminal 34, converts the AC electric power inputted from power reception terminal 34 to a voltage level of power storage device 26 based on a control signal from charging ECU 40, and outputs the converted electric power to positive electrode line PL and negative electrode line NL.

Non-contact power reception unit 36 (described below) is connected to charger 32. At the time of charging power storage device 26 using non-contact power reception unit 36, charger 32 receives AC electric power received from AC power supply 52 by non-contact power reception unit 36 from non-contact power reception unit 36, converts the AC electric power received from non-contact power reception unit 36 to a voltage level of power storage device 26 based on the control signal from charging ECU 40, and outputs the converted electric power to positive electrode line PL and negative electrode line NL. This configuration of charger 32 will be described in detail later.

Power reception terminal 34 is an electric power interface for conductive charging by AC power supply 50 external to the vehicle. Power reception terminal 34 is configured to be electrically connectable to a power supply outlet and the like (not shown) of AC power supply 50.

Non-contact power reception unit 36 is an electric power interface for inductive charging (non-contact charging) by AC power supply 52 external to the vehicle. Non-contact power reception unit 36 includes a power reception coil 38 that can be magnetically coupled to a power transmission coil 54 of AC power supply 52. Power reception coil 38 is magnetically coupled to power transmission coil 54 of AC power supply 52 to receive electric power from AC power supply 52 in a non-contact manner. It is to be noted that magnetic coupling between power reception coil 38 and power transmission coil 54 may be implemented by electromagnetic induction or a resonance method of resonating power reception coil 38 and power transmission coil 54 with the magnetic field interposed therebetween.

At the time of charging power storage device 26 by AC power supply 50 or 52, charging ECU 40 controls the operation of charger 32. In the first embodiment, conductive charging by AC power supply 50 and inductive charging by AC power supply 52 cannot be performed at the same time, and thus, charging ECU 40 also performs control over switching between conductive charging and inductive charging.

DC/DC converter 42 is connected to positive electrode line PL and negative electrode line NL. DC/DC converter 42 steps down electric power received from positive electrode line PL and negative electrode line NL to an operation voltage of auxiliary machine 44, and outputs the electric power to auxiliary machine 44. Auxiliary machine 44 comprehensively represents each auxiliary machine of this vehicle 1 and is supplied with electric power from DC/DC converter 42.

Figure 2:
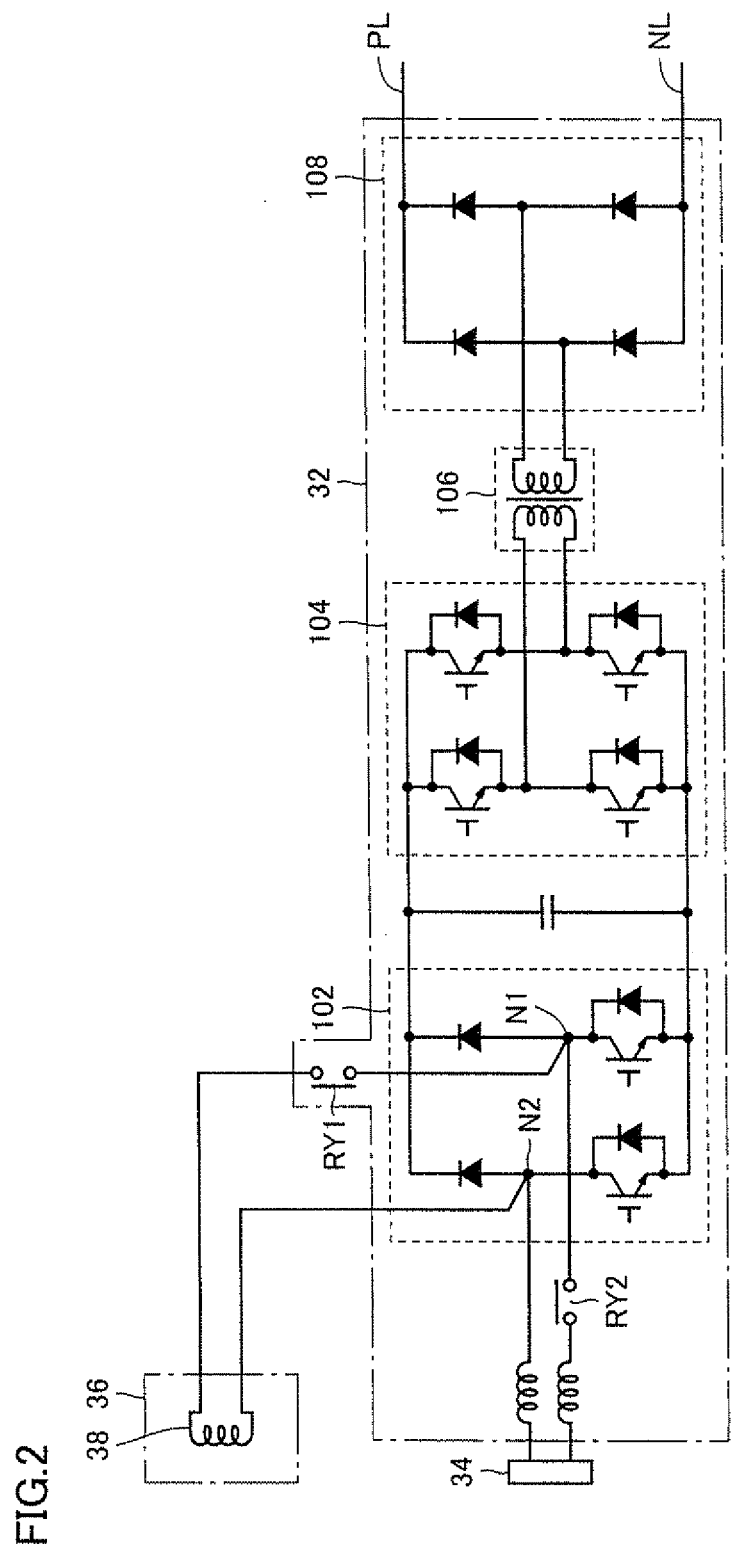
FIG. 2 shows in detail a configuration of a charger shown in FIG. 1.

FIG. 2 shows in detail a configuration of charger 32 shown in FIG. 1. Referring to FIG. 2, charger 32 includes a rectification unit 102, an inverter 104, an insulating transformer 106, a rectification unit 108, and relays RY1 and RY2.

Rectification unit 102 includes two upper-and-lower arms connected in parallel, and each upper-and-lower arm includes two rectification elements (diodes) connected in series. Power reception terminal 34 is connected to an intermediate point (node N1, N2) of each upper-and-lower arm, and rectification unit 102 rectifies AC electric power inputted from power reception terminal 34. It is to be noted that the lower arm of each upper-and-lower arm includes a switching element, and further, an electric power line between power reception terminal 34 and node N1, N2 includes a reactor. As a result, rectification unit 102 constitutes a step-up chopper circuit together with the reactor, and can rectify and step up the electric power inputted from power reception terminal 34.

Inverter 104 is connected to rectification unit 102 and converts an output from rectification unit 102 to AC. Inverter 104 is formed of, for example, a full bridge circuit. Insulating transformer 106 is connected between inverter 104 and rectification unit 108, and electrically insulates AC power supply 50 to which power reception terminal 34 is connected from an electrical system of vehicle 1 to which rectification unit 108 is connected.

Rectification unit 108 includes two upper-and-lower arms connected in parallel between positive electrode line PL and negative electrode line NL, and each upper-and-lower arm includes two rectification elements (diodes) connected in series. A secondary coil of insulating transformer 106 is connected to an intermediate node of each upper-and-lower arm, and rectification unit 108 rectifies an output of insulating transformer 106 and outputs the rectified output to positive electrode line PL and negative electrode line NL.

Rectification unit 102 is formed of the rectification element having more excellent high-frequency rectification property than that of the rectification element constituting rectification unit 108. Silicon carbide (SiC), gallium nitride (GaN) and the like are known to have more excellent high-frequency rectification property than general silicon (Si). For example, the rectification element of rectification unit 102 is made of SiC and the rectification element of rectification unit 108 is made of general Si.

In the first embodiment, non-contact power reception unit 36 is connected to rectification unit 102. In other words, power reception coil 38 of non-contact power reception unit 36 is connected to nodes N1 and N2 in rectification unit 102. At the time of inductive charging during which non-contact power reception unit 36 receives charging power, the electric power received by non-contact power reception unit 36 is rectified by rectification unit 102.

In the present embodiment, non-contact power reception unit 36 is connected to rectification unit 102. This is because the AC electric power received by non-contact power reception unit 36 has a high frequency (particularly in the resonance method, the received AC electric power may have a frequency of 1 M to ten and several megahertz), and thus, rectification unit 102 formed of the rectification element having excellent high-frequency rectification property is used as a rectifier at the time of inductive charging.

Relay RY1 is provided between node N1 in rectification unit 102 and non-contact power reception unit 36. Relay RY2 is provided between node N1 in rectification unit 102 and power reception terminal 34. Relays RY1 and RY2 are turned on/off in accordance with the control signal from charging ECU 40 (FIG. 1).

In this charger 32, at the time of conductive charging by AC power supply 50, relay RY1 is turned off and relay RY2 is turned on. Then, rectification unit 102 rectifies electric power (AC) inputted from power reception terminal 34, and outputs the rectified electric power to inverter 104. Inverter 104 converts the electric power (DC) outputted from rectification unit 102 to AC. Insulating transformer 106 transmits the output (AC) of inverter 104 to rectification unit 108. Rectification unit 108 rectifies the electric power (AC) received from insulating transformer 106, and outputs the rectified electric power to positive electrode line PL and negative electrode line NL.

At the time of inductive charging by AC power supply 52, relay RY1 is turned on and relay RY2 is turned off. Then, rectification unit 102 rectifies electric power (AC) received by non-contact power reception unit 36, and outputs the rectified electric power to inverter 104. It is to be noted that the subsequent processing by inverter 104, insulating transformer 106 and rectification unit 108 is as described above.

As described above, in the first embodiment, non-contact power reception unit 36 is connected to rectification unit 102 in charger 32 performing conductive charging. At the time of inductive charging using non-contact power reception unit 36, rectification unit 102, inverter 104, insulating transformer 106, and rectification unit 108 in charger 32 are used. In other words, rectification unit 102, inverter 104, insulating transformer 106, and rectification unit 108 in charger 32 are used both at the time of conductive charging and at the time of inductive charging.

Figure 3:
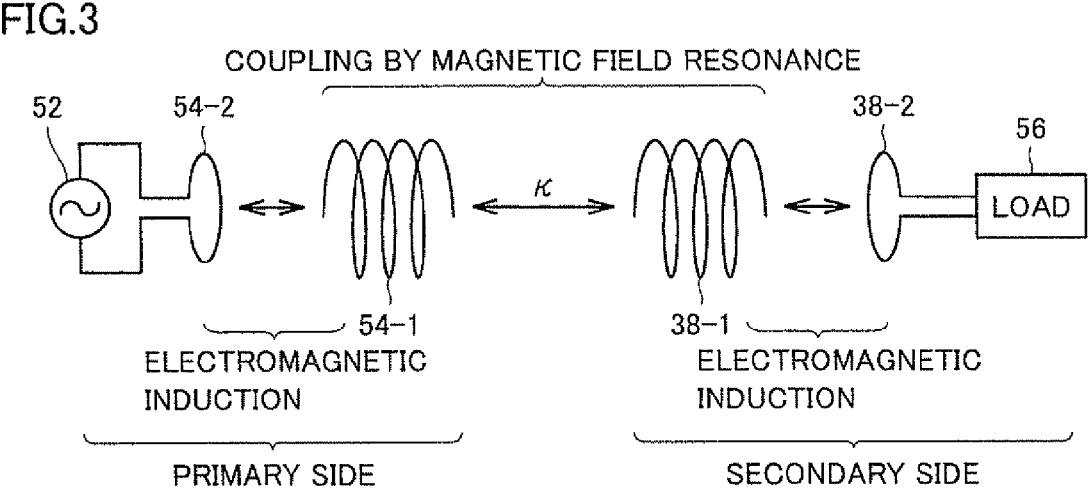
FIG. 3 is a diagram for describing a resonance method, which is an example of a manner of power reception by a non-contact power reception unit.

FIG. 3 is a diagram for describing the resonance method, which is an example of a manner of power reception by non-contact power reception unit 36. Referring to FIG. 3, in the resonance method, two LC resonant coils having the same natural frequency resonate each other in the electromagnetic field (near field) similarly to resonance of two tuning forks, to transmit electric power from one coil to the other coil through the electromagnetic field.

For example, a primary coil 54-2 is connected to AC power supply 52 and high-frequency electric power of 1 M to ten and several megahertz is fed to a primary self-resonant coil 54-1 magnetically coupled to primary coil 54-2 by electromagnetic induction. Primary self-resonant coil 54-1 is an LC resonator having inductance and stray capacitance of the coil itself, and resonates with a secondary self-resonant coil 38-1 having the same resonance frequency as that of primary self-resonant coil 54-1, with the electromagnetic field (near field) interposed therebetween. As a result, energy (electric power) moves from primary self-resonant coil 54-1 to secondary self-resonant coil 38-1 through the electromagnetic field. The energy (electric power) that has moved to secondary self-resonant coil 38-1 is taken out by a secondary coil 38-2 magnetically coupled to secondary self-resonant coil 38-1 by electromagnetic induction, and is supplied to a load 56. It is to be noted that power transmission using the resonance method is implemented when a Q value indicating the resonance strength of primary self-resonant coil 54-1 and secondary self-resonant coil 38-1 is larger than 100, for example.

It is to be noted that secondary self-resonant coil 38-1 and secondary coil 38-2 constitute power reception coil 38 in FIG. 2, and primary self-resonant coil 54-1 and primary coil 54-2 constitute power transmission coil 54 in FIG. 1.

As described above, electromagnetic induction may be used to transmit electric power from power transmission coil 54 of AC power supply 52 to power reception coil 38 of non-contact power reception unit 36.

As described above, in the first embodiment, conductive charging during which power reception terminal 34 receives the AC electric power supplied from AC power supply 50 external to the vehicle, and inductive charging during which non-contact power reception unit 36 receives the AC electric power are possible. Since non-contact power reception unit 36 is connected to rectification unit 102 in charger 32, rectification unit 102, inverter 104, insulating transformer 106, and rectification unit 108 in charger 32 are used both at the time of conductive charging and at the time of inductive charging. As a result, separately providing a charger for inductive charging is not necessary. Therefore, according to the first embodiment, both conductive charging (plug-in charging) and inductive charging (non-contact charging) become possible while suppressing an increase in cost.

In addition, in the first embodiment, non-contact power reception unit 36 is connected to rectification unit 102 formed of the rectification element having more excellent high-frequency rectification property, of rectification units 102 and 108 in charger 32. Therefore, ripples at the time of inductive charging can be sufficiently suppressed.

Second Embodiment

Figure 4:
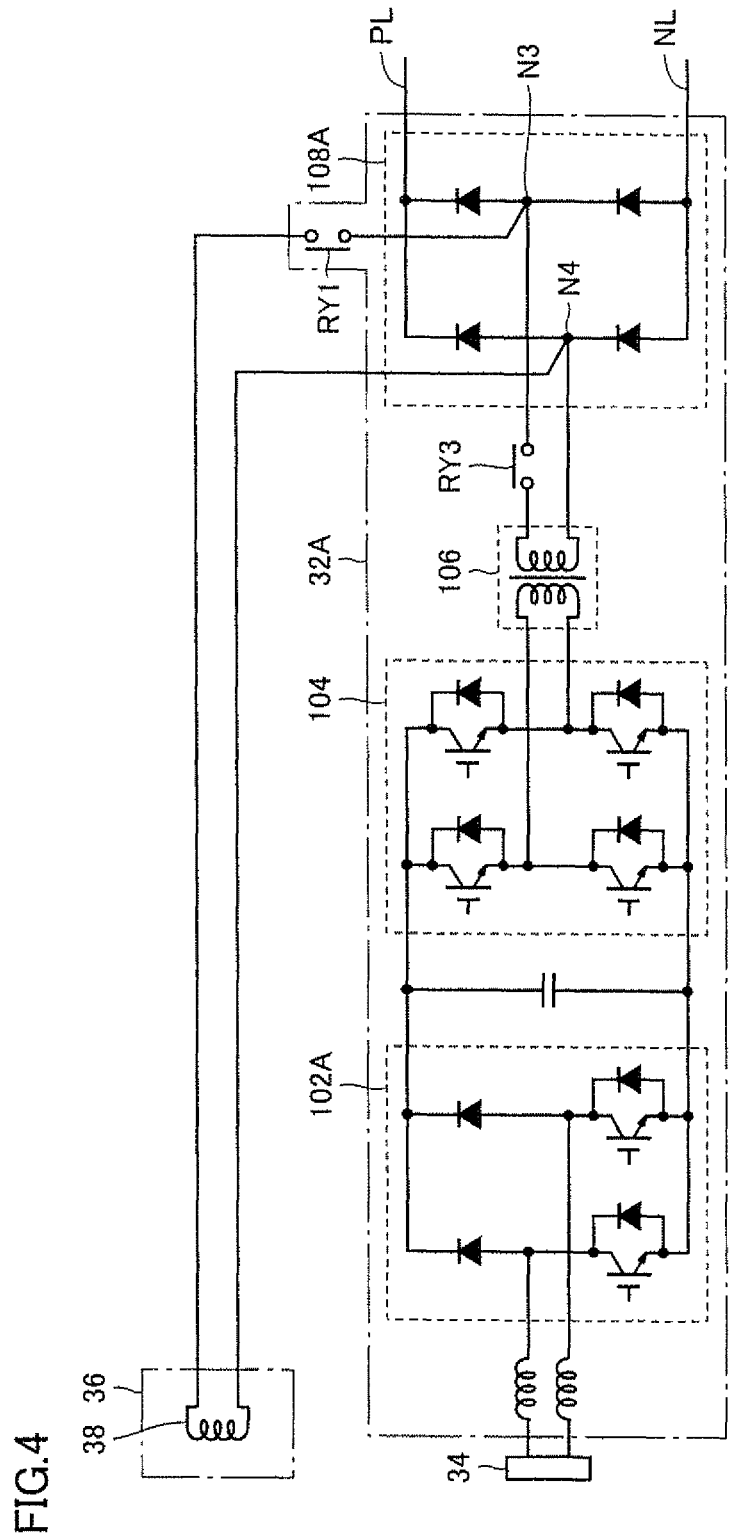
FIG. 4 shows a configuration of a charger in a second embodiment.

FIG. 4 shows a configuration of a charger 32A in a second embodiment. Referring to FIG. 4, charger 32A includes rectification units 102A and 108A instead of rectification units 102 and 108, and includes a relay RY3 instead of relay RY2 in the configuration of charger 32 in the first embodiment as shown in FIG. 2.

Rectification unit 108A is formed of a rectification element having more excellent high-frequency rectification property than that of a rectification element constituting rectification unit 102A. For example, the rectification element of rectification unit 108A is made of SiC, GaN or the like, and the rectification element of rectification unit 102A is made of general Si. It is to be noted that circuit configurations of rectification units 102A and 108A are the same as those of rectification units 102 and 108, respectively.

In the second embodiment, non-contact power reception unit 36 is connected to rectification unit 108A. In other words, power reception coil 38 of non-contact power reception unit 36 is connected to nodes N3 and N4 in rectification unit 108A. At the time of inductive charging during which non-contact power reception unit 36 receives the charging power, the electric power received by non-contact power reception unit 36 is rectified by rectification unit 108A.

In the present embodiment, non-contact power reception unit 36 is connected to rectification unit 108A, not to rectification unit 102A. This is because the AC electric power received by non-contact power reception unit 36 has a high frequency as described above, and thus, rectification unit 108A formed of the rectification element having excellent high-frequency rectification property is used as a rectifier at the time of inductive charging.

In the second embodiment, relay RY1 is provided between node N3 in rectification unit 108A and non-contact power reception unit 36. Relay RY3 is provided between node N3 in rectification unit 108A and the secondary coil of insulating transformer 106. Relays RY1 and RY3 are turned on/off in accordance with the control signal from charging ECU 40 (FIG. 1).

In this charger 32A, relay RY1 is turned on and relay RY3 is turned off at the time of inductive charging by AC power supply 52. Then, rectification unit 108A rectifies electric power (AC) received by non-contact power reception unit 36, and outputs the rectified electric power to positive electrode line PL and negative electrode line NL. It is to be noted that relay RY1 is turned off and relay RY3 is turned on at the time of conductive charging by AC power supply 50.

As described above, in the second embodiment, non-contact power reception unit 36 is connected to rectification unit 108A in charger 32A, and rectification unit 108A in charger 32A is used both at the time of conductive charging and at the time of inductive charging. Therefore, according to the second embodiment as well, both conductive charging (plug-in charging) and inductive charging (non-contact charging) become possible while suppressing an increase in cost.

In addition, in the second embodiment as well, non-contact power reception unit 36 is connected to rectification unit 108A formed of the rectification element having more excellent high-frequency rectification property, of rectification units 102A and 108A in charger 32A. Therefore, ripples at the time of inductive charging can be sufficiently suppressed.

Third Embodiment

Figure 5:
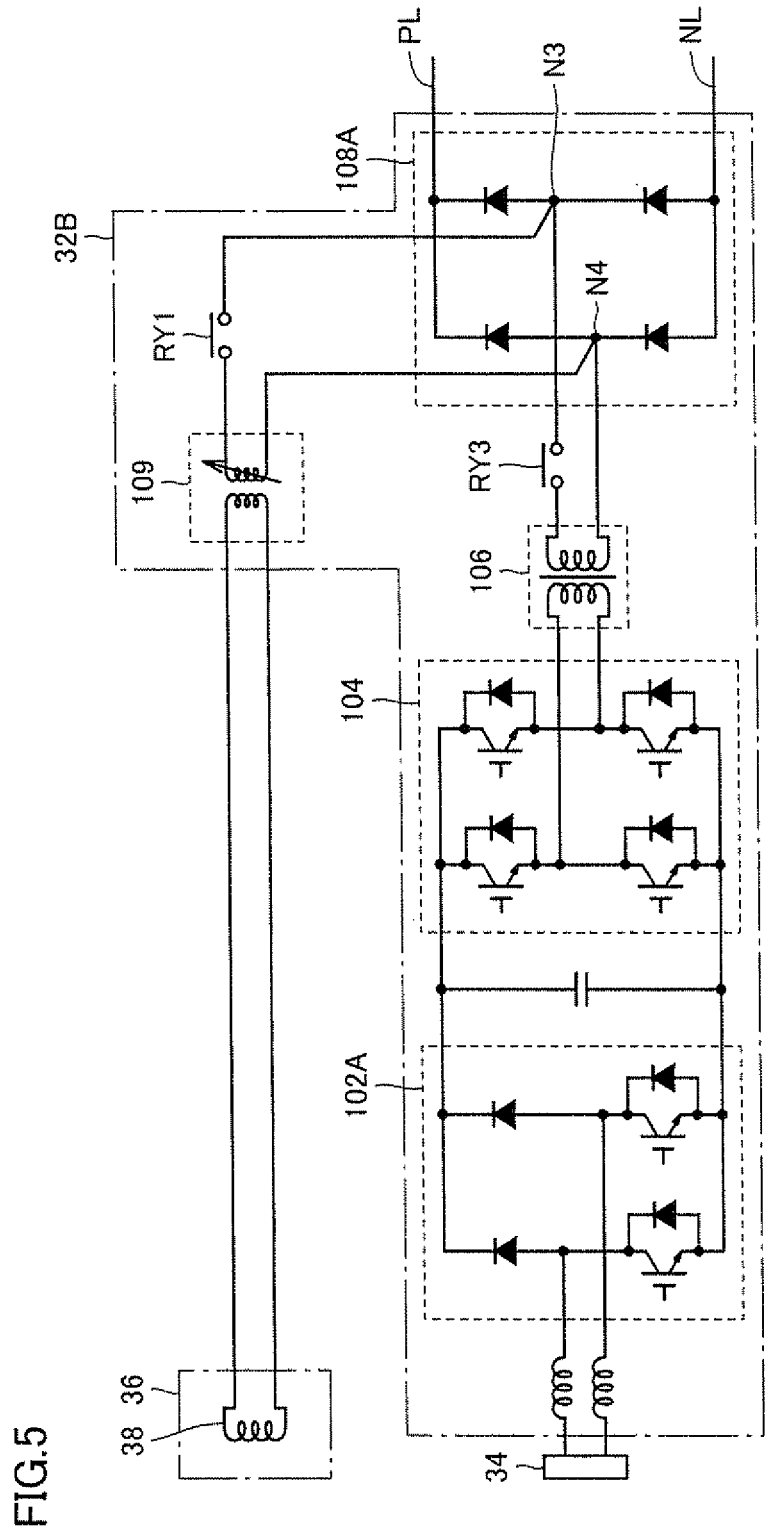
FIG. 5 shows a configuration of a charger in a third embodiment.

FIG. 5 shows a configuration of a charger 32B in a third embodiment. Referring to FIG. 5, charger 32B further includes a transformer 109 in the configuration of charger 32A in the second embodiment as shown in FIG. 4.

Transformer 109 is provided between non-contact power reception unit 36 and rectification unit 108A. Transformer 109 may be a variable winding type transformer or a fixed winding type transformer. Transformer 109 converts AC electric power received by non-contact power reception unit 36 to a predetermined voltage. This predetermined voltage is determined in accordance with a target of a voltage outputted to positive electrode line PL and negative electrode line NL.

It is to be noted that the remaining configuration of charger 32B is the same as that of charger 32A in the second embodiment as shown in FIG. 4.

According to the third embodiment, simply by adding transformer 109, the voltage conversion function at the time of inductive charging can be implemented with high efficiency and at low cost.

Fourth Embodiment

Figure 6:
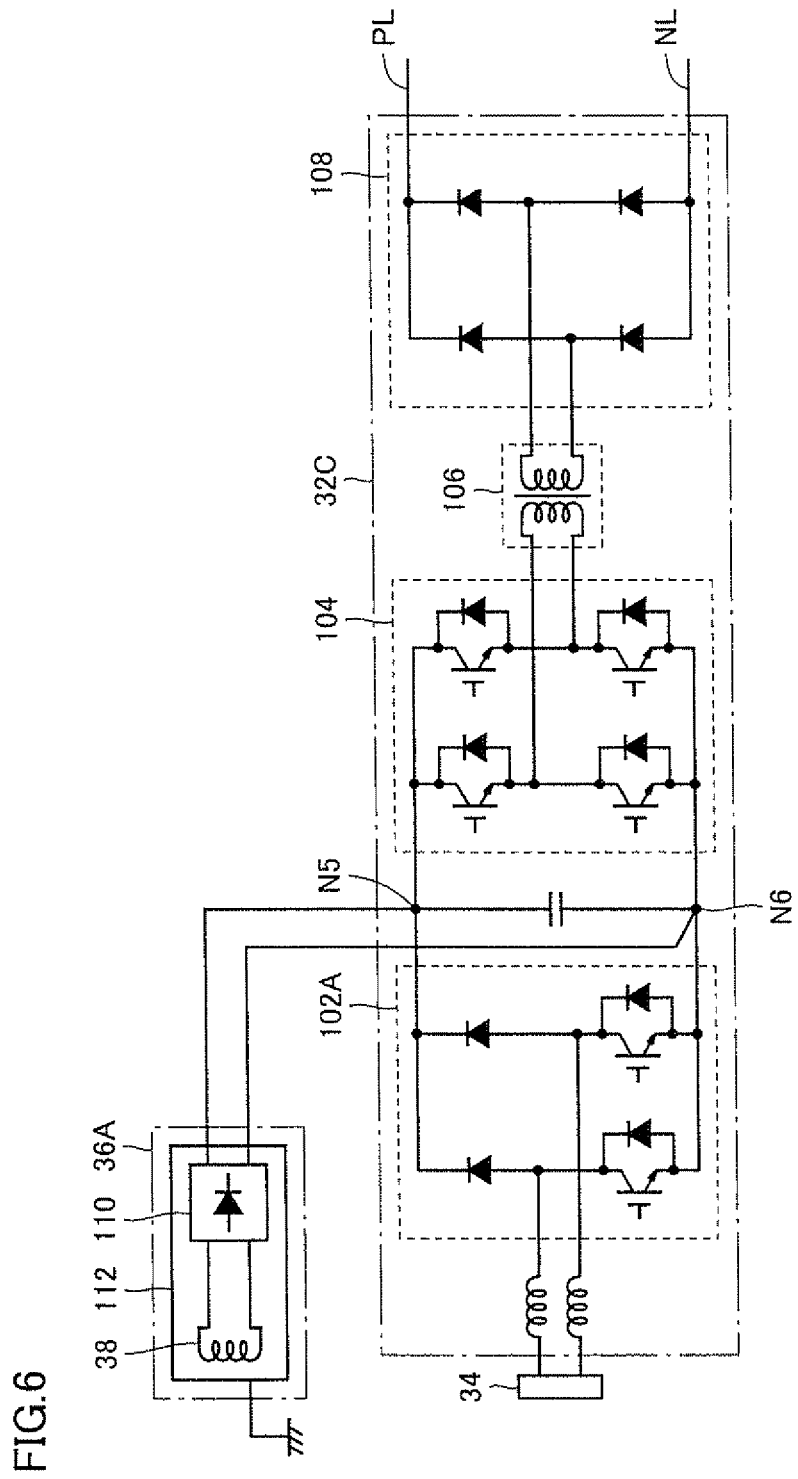
FIG. 6 shows a configuration of a non-contact power reception unit and a charger in a fourth embodiment.

In a fourth embodiment, a rectification unit is provided in a non-contact power reception unit. FIG. 6 shows a configuration of a non-contact power reception unit 36A and a charger 32C in the fourth embodiment. Referring to FIG. 6, non-contact power reception unit 36A includes power reception coil 38, a rectification unit 110 and an electromagnetic shielding material 112.

Rectification unit 110 is connected to power reception coil 38, and rectifies AC electric power received by power reception coil 38 and outputs the electric power to charger 32C. For example, similarly to the above-mentioned rectification unit in the charger, rectification unit 110 includes two upper-and-lower arms connected in parallel, and each upper-and-lower arm includes two rectification elements (diodes) connected in series. Power reception coil 38 is connected to an intermediate point of each upper-and-lower arm.

It is to be noted that rectification unit 110 is preferably formed of a rectification element having excellent high-frequency rectification property such as SiC and GaN, similarly to above-mentioned rectification units 102 and 108A.

Electromagnetic shielding material 112 shields high-frequency electromagnetic waves (in the case of the resonance method, the frequency may be 1 M to ten and several megahertz) generated around power reception coil 38 and rectification unit 110 with power reception by power reception coil 38. In other words, since the high-frequency electromagnetic waves also propagate to rectification unit 110 rectifying the AC electric power received by power reception coil 38, electromagnetic shielding material 112 shields power reception coil 38 and rectification unit 110 integrally. As a result, diffusion of the high-frequency electromagnetic waves generated with inductive charging into the surroundings can be prevented. It is to be noted that a metallic component such as iron having a high electromagnetic shielding effect, a cloth having an electromagnetic shielding effect or the like can be used as electromagnetic shielding material 112.

Charger 32C includes rectification unit 102A, inverter 104, insulating transformer 106, and rectification unit 108. Each of rectification unit 102A, inverter 104, insulating transformer 106, and rectification unit 108 has already been described, and thus, a description thereof will not be repeated.

Non-contact power reception unit 36A is connected to nodes N5 and N6 in a DC link between rectification unit 102A and inverter 104.

In the fourth embodiment, rectification unit 110 is provided in non-contact power reception unit 36A, and thus, electric power does not flow from charger 32C to power reception coil 38 of non-contact power reception unit 36A at the time of conductive charging. Therefore, in the fourth embodiment, relays RY1 to RY3 as seen in the first to third embodiments are unnecessary.

In the fourth embodiment, at the time of inductive charging by AC power supply 52, the electric power received by power reception coil 38 is rectified by rectification unit 110 and is outputted to charger 32C. Then, the electric power outputted from non-contact power reception unit 36A to charger 32C is subjected to voltage conversion to a predetermined voltage and is outputted to positive electrode line PL and negative electrode line NL by inverter 104, insulating transformer 106 and rectification unit 108 in charger 32C.

In the fourth embodiment, rectification unit 110 is provided in non-contact power reception unit 36A, and thus, the electric power inputted from power reception terminal 34 does not flow to power reception coil 38 of non-contact power reception unit 36A. In addition, because of rectification unit 102A in charger 32C, the electric power received by power reception coil 38 of non-contact power reception unit 36A does not flow to power reception terminal 34, either. Therefore, in the fourth embodiment, conductive charging during which power reception terminal 34 receives the charging power and inductive charging during which power reception coil 38 receives the charging power can also be performed at the same time.

As described above, according to the fourth embodiment, simply by adding a small number of components, both conductive charging and inductive charging become possible. In addition, according to the fourth embodiment, power reception coil 38 and rectification unit 110 can be integrally shielded from electromagnetic waves, and thus, a configuration of the shield is also simplified. Furthermore, according to the fourth embodiment, conductive charging and inductive charging can be performed at the same time, and thus, the charging time can be shortened.

Fifth Embodiment

In a fifth embodiment, a description will be given to a configuration including the voltage conversion function when a non-contact power reception unit is formed of above-mentioned non-contact power reception unit 36A.

Figure 7:
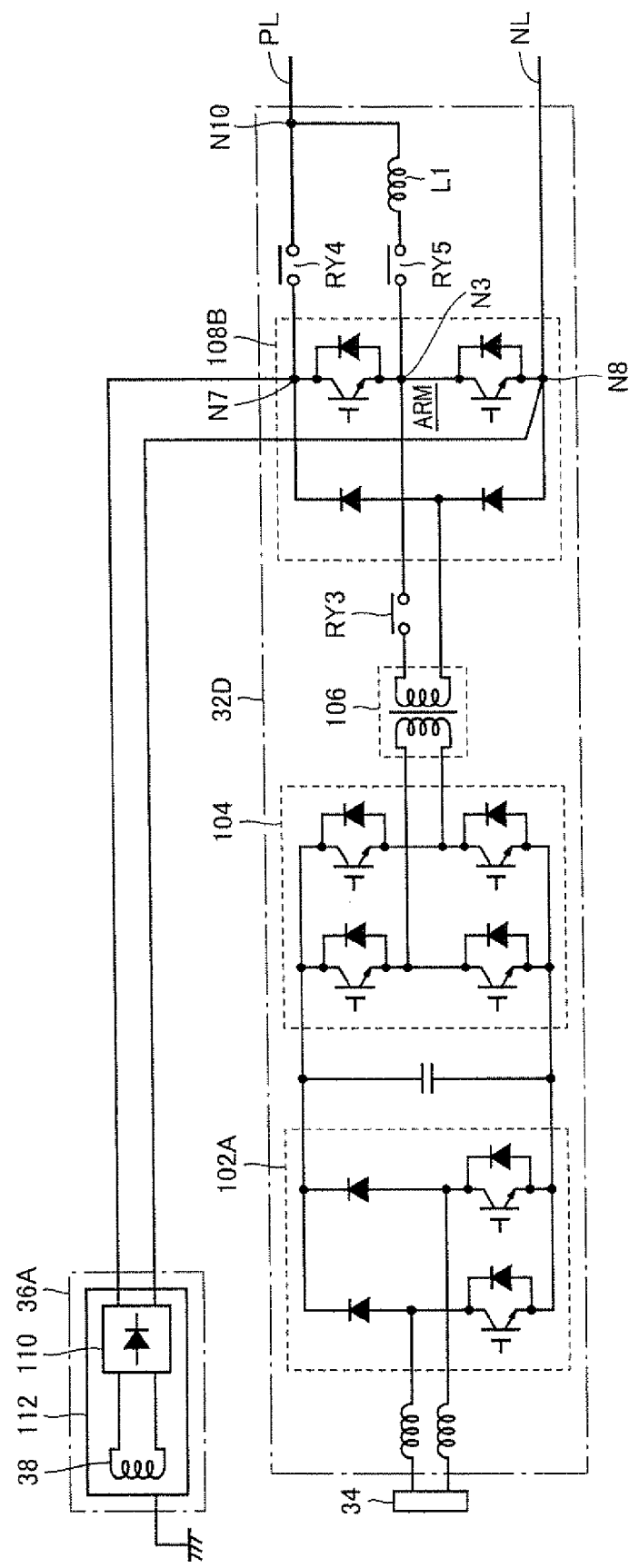
FIG. 7 shows a configuration of a charger in a fifth embodiment.

FIG. 7 shows a configuration of a charger 32D in the fifth embodiment. Referring to FIG. 7, charger 32D includes a rectification unit 108B instead of rectification unit 108, and further includes a reactor L1 and relays RY3 to RY5 in the configuration of charger 32C in the fourth embodiment as shown in FIG. 6.

Rectification unit 108B includes a switching element provided at each arm of one upper and lower arms in the configuration of rectification unit 108 (the upper-and-lower arm including the switching element will also be referred to as "upper-and-lower arm ARM" hereinafter).

Relay RY3 is disposed between an intermediate node N3 of upper-and-lower arm ARM and the secondary coil of insulating transformer 106. Relay RY4 is disposed between a node N7 on the positive electrode side of upper-and-lower arm ARM and a node N10 on positive electrode line PL. Relay RY5 and reactor L1 are connected in series between node N3 and node N10. Non-contact power reception unit 36A is connected to nodes N7 and N8.

In this charger 32D, at the time of conductive charging during which the charging power is inputted from power reception terminal 34, relays RY3 and RY4 are turned on and relay RY5 is turned off in accordance with a signal from charging ECU 40 (FIG. 1). As a result, the AC electric power inputted from power reception terminal 34 is subjected to voltage conversion and is outputted to positive electrode line PL and negative electrode line NL by rectification unit 102A, inverter 104, insulating transformer 106, and rectification unit 108B.

Figure 8:
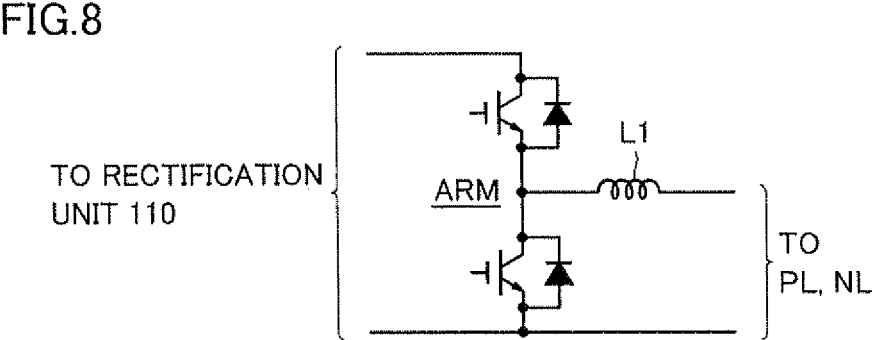
FIG. 8 shows a step-down-type chopper circuit formed by upper and lower arms and a reactor.

At the time of inductive charging by non-contact power reception unit 36A, relays RY3 and RY4 are turned off and relay RY5 is turned on in accordance with the signal from charging ECU 40. Then, insulating transformer 106 is electrically disconnected from rectification unit 108B, and reactor L1 is electrically connected between the intermediate node of upper-and-lower arm ARM and positive electrode line PL. As a result, as shown in FIG. 8, upper-and-lower arm ARM and reactor L1 form a step-down-type chopper circuit, and DC electric power outputted from non-contact power reception unit 36A is converted to a predetermined voltage and is outputted to positive electrode line PL and negative electrode line NL.

As described above, according to the fifth embodiment, the voltage conversion function (step-down type) at the time of inductive charging can be implemented with high efficiency and at low cost, in addition to the effect similar to that in the fourth embodiment.

Sixth Embodiment

The step-down-type chopper circuit is formed using rectification unit 108E in the fifth embodiment, whereas a step-up-type chopper circuit is formed using rectification unit 108B in a sixth embodiment.

Figure 9:
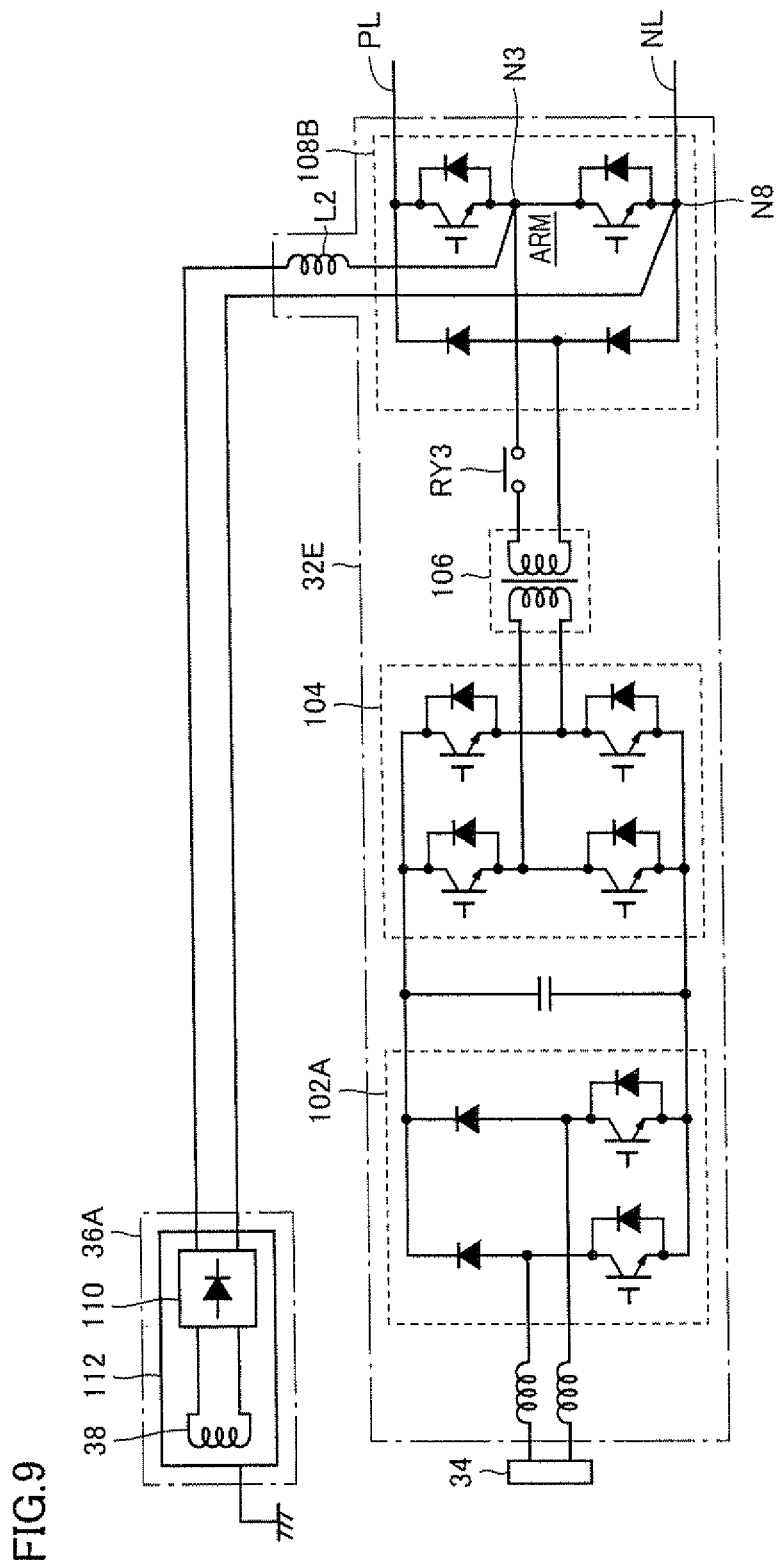
FIG. 9 shows a configuration of a charger in a sixth embodiment.

FIG. 9 shows a configuration of a charger 32E in the sixth embodiment. Referring to FIG. 9, charger 32E includes rectification unit 108B instead of rectification unit 108, and further includes a reactor L2 and relay RY3 in the configuration of charger 32C in the fourth embodiment as shown in FIG. 6. Non-contact power reception unit 36A is connected between intermediate node N3 of upper-and-lower arm ARM and a node N8 on the negative electrode side of upper-and-lower arm ARM. Reactor L2 is disposed on an electric power line between node N3 and non-contact power reception unit 36A. It is to be noted that the remaining configuration has already been described, and thus, a description thereof will not be repeated.

In this charger 32E, at the time of conductive charging during which the charging power is inputted from power reception terminal 34, relay RY3 is turned on. As a result, AC electric power inputted from power reception terminal 34 is subjected to voltage conversion and is outputted to positive electrode line PL and negative electrode line NL by rectification unit 102A, inverter 104, insulating transformer 106, and rectification unit 108B. It is to be noted that since rectification unit 110 is provided in non-contact power reception unit 36A, the electric power does not flow from charger 32E to power reception coil 38 at the time of conductive charging.

Figure 10:
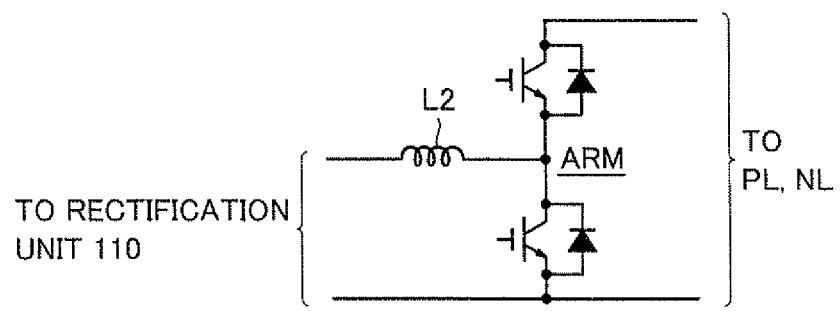
FIG. 10 shows a step-up-type chopper circuit formed by upper and lower arms and a reactor.

At the time of inductive charging by non-contact power reception unit 36A, relay RY3 is turned off. Then, insulating transformer 106 is electrically disconnected from rectification unit 108B. As a result, as shown in FIG. 10, upper-and-lower arm ARM and reactor L2 form the step-up-type chopper circuit, and DC electric power outputted from non-contact power reception unit 36A is converted to a predetermined voltage and is outputted to positive electrode line PL and negative electrode line NL.

As described above, according to the sixth embodiment, the voltage conversion function (step-up type) at the time of inductive charging can be implemented with high efficiency and at low cost, in addition to the effect similar to that in the fourth embodiment.

Seventh Embodiment

The step-down-type chopper circuit is formed at the time of inductive charging by separately providing reactor L1 in the fifth embodiment, whereas the secondary coil of insulating transformer 106 is also used as a reactor of a chopper circuit without separately providing reactor L1 in a seventh embodiment.

Figure 11:
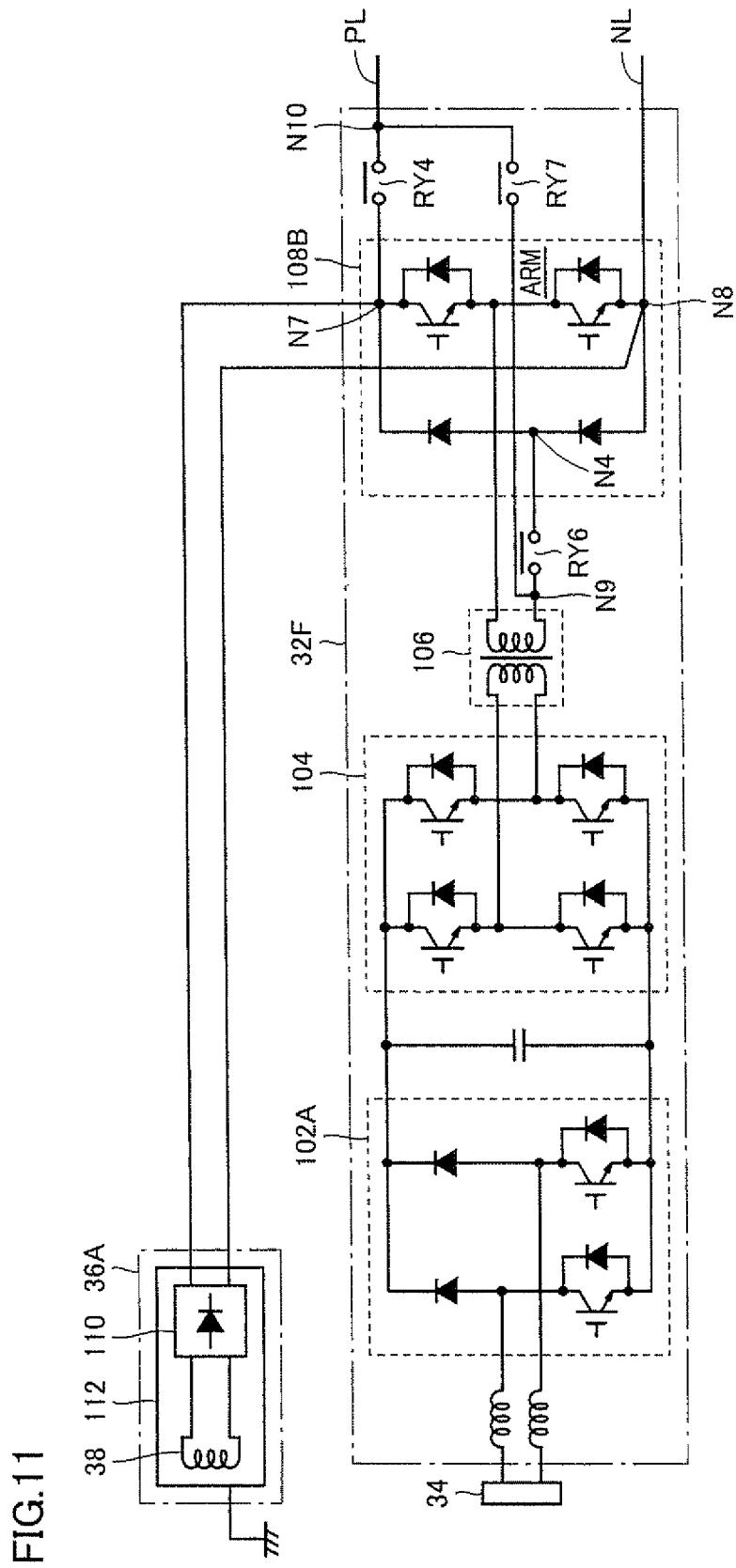
FIG. 11 shows a configuration of a charger in a seventh embodiment.

FIG. 11 shows a configuration of a charger 32F in the seventh embodiment. Referring to FIG. 11, charger 32F does not include reactor L1 and includes relays RY6 and RY7 instead of relays RY3 and RY5 in the configuration of charger 32D in the fifth embodiment as shown in FIG. 7.

Relay RY6 is disposed between an intermediate node N4 of the upper-and-lower arm different from upper-and-lower arm ARM in rectification unit 108B and the secondary coil of insulating transformer 106. Relay RY7 is disposed between a node N9, which is a connection point between the secondary coil of insulating transformer 106 and relay RY6, and node N10 on positive electrode line PL. It is to be noted that the remaining configuration of charger 32F is the same as that of charger 32D.

In this charger 32F, at the time of conductive charging during which the charging power is inputted from power reception terminal 34, relays RY4 and RY6 are turned on and relay RY7 is turned off in accordance with the signal from charging ECU 40 (FIG. 1). As a result, AC electric power inputted from power reception terminal 34 is subjected to voltage conversion and is outputted to positive electrode line PL and negative electrode line NL by rectification unit 102A, inverter 104, insulating transformer 106, and rectification unit 108B.

On the other hand, at the time of inductive charging by non-contact power reception unit 36A, relays RY4 and RY6 are turned off and relay RY7 is turned on in accordance with the signal from charging ECU 40. As a result, upper-and-lower arm ARM and the secondary coil of insulating transformer 106 form the step-down-type chopper circuit, and DC electric power outputted from non-contact power reception unit 36A is converted to a predetermined voltage and is outputted to positive electrode line PL and negative electrode line NL.

As described above, according to the seventh embodiment, the voltage conversion function (step-down type) at the time of inductive charging can be implemented with high efficiency and at low cost without separately providing the reactor.

Eighth Embodiment

The step-up-type chopper circuit is formed at the time of inductive charging by separately providing reactor L2 in the sixth embodiment, whereas the secondary coil of insulating transformer 106 is also used as a reactor of a chopper circuit without separately providing reactor L2 in an eighth embodiment.

Figure 12:
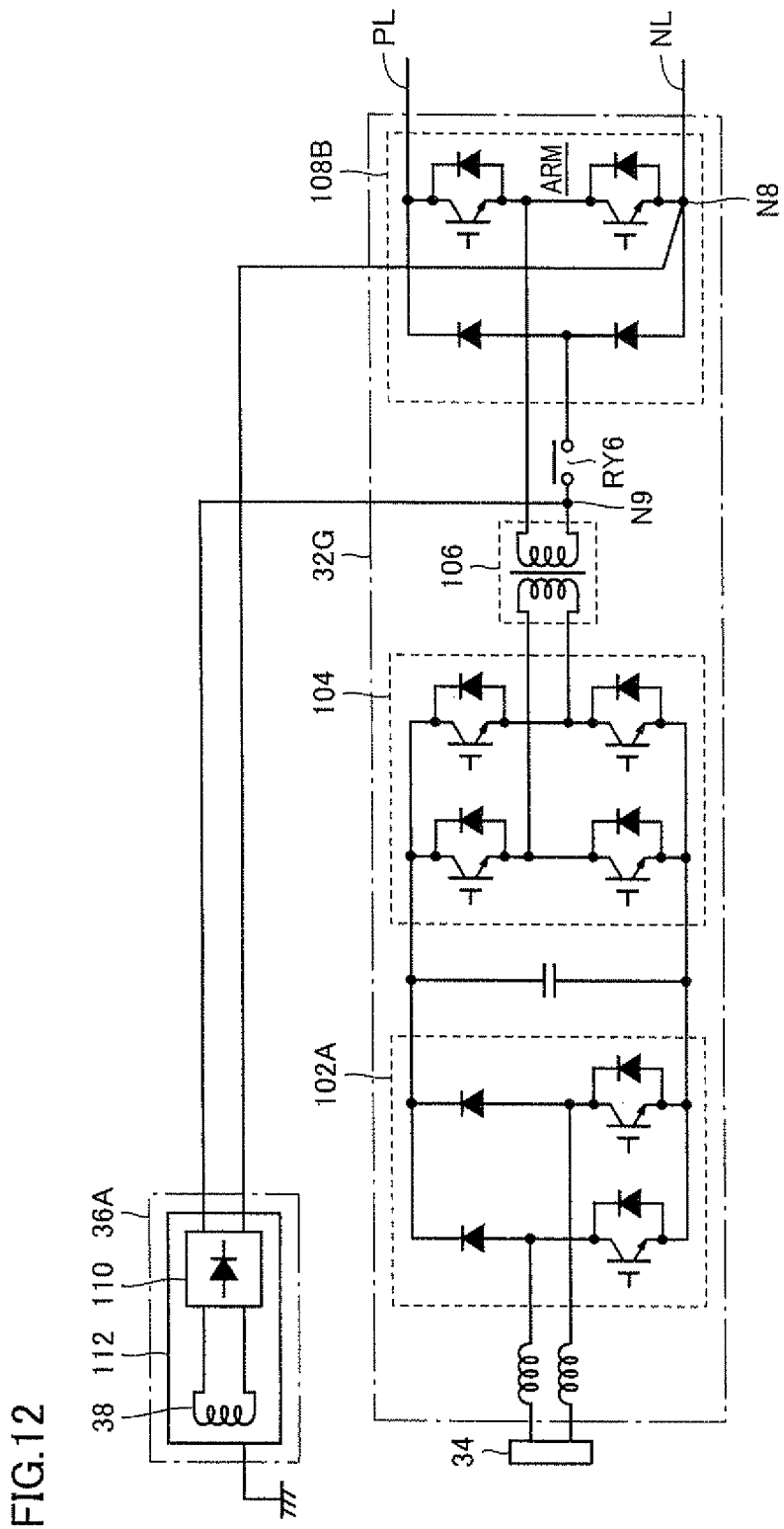
FIG. 12 shows a configuration of a charger in an eighth embodiment.

FIG. 12 shows a configuration of a charger 32G in the eighth embodiment. Referring to FIG. 12, charger 32G does not include reactor L2 and includes relay RY6 instead of relay RY3 in the configuration of charger 32E in the sixth embodiment as shown in FIG. 9. Non-contact power reception unit 36A is connected to nodes N8 and N9. It is to be noted that the remaining configuration of charger 32G is the same as that of charger 32E.

In this charger 32G, at the time of conductive charging during which the charging power is inputted from power reception terminal 34, relay RY6 is turned on in accordance with the signal from charging ECU 40 (FIG. 1). As a result, AC electric power inputted from power reception terminal 34 is subjected to voltage conversion and is outputted to positive electrode line PL and negative electrode line NL by rectification unit 102A, inverter 104, insulating transformer 106, and rectification unit 108B.

On the other hand, at the time of inductive charging by non-contact power reception unit 36A, relay RY6 is turned off in accordance with the signal from charging ECU 40. As a result, the secondary coil of insulating transformer 106 and upper-and-lower arm ARM form the step-up-type chopper circuit, and DC electric power outputted from non-contact power reception unit 36A is converted to a predetermined voltage and is outputted to positive electrode line PL and negative electrode line NL.

As described above, according to the eighth embodiment, the voltage conversion function (step-up type) at the time of inductive charging can be implemented with high efficiency and at low cost without separately providing the reactor.

Ninth Embodiment

Figure 13:
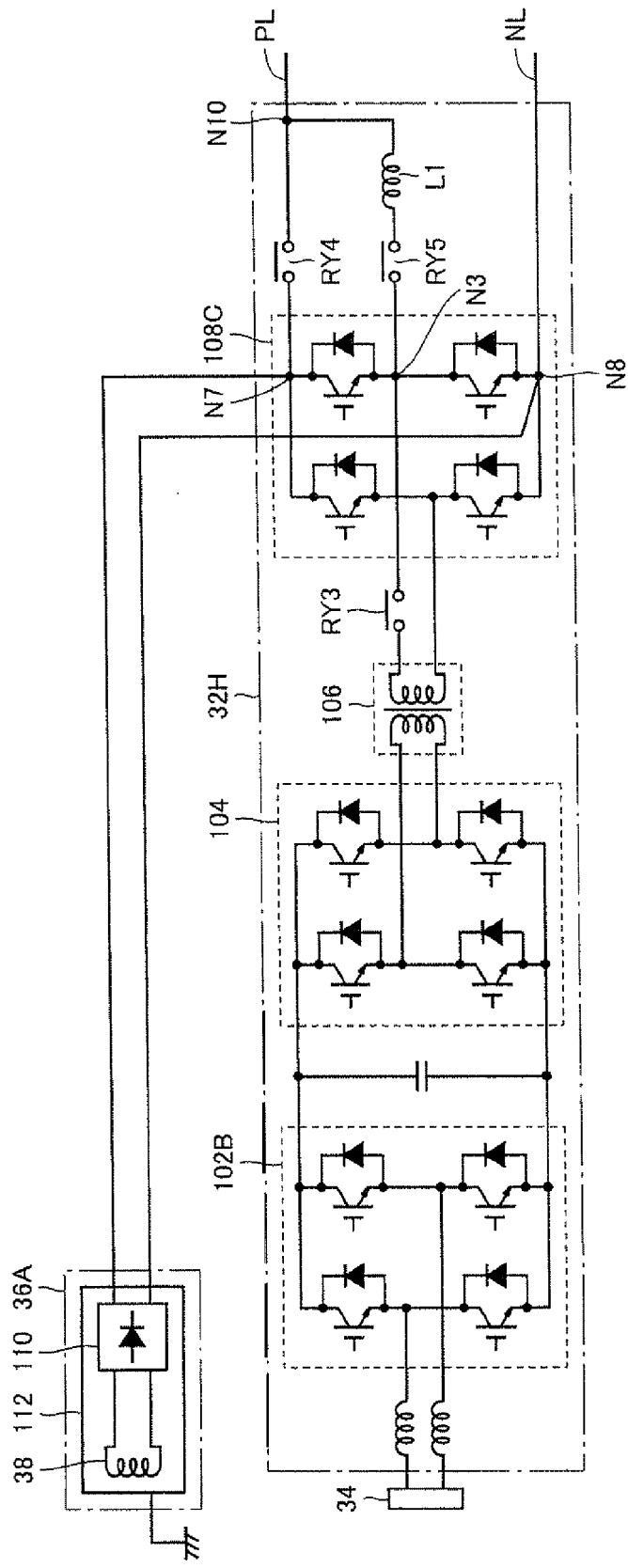
FIG. 13 shows a configuration of a charger in a ninth embodiment.

FIG. 13 shows a configuration of a charger 32H in a ninth embodiment. Referring to FIG. 13, charger 32H includes inverters 102B and 108C instead of rectification units 102A and 108B, respectively, in the configuration of charger 32D in the fifth embodiment as shown in FIG. 7.

Inverters 102B and 108C are each formed of a full bridge circuit similarly to inverter 104. Inverter 102B can convert AC electric power inputted from power reception terminal 34 to DC and output the DC electric power to inverter 104 in accordance with the signal from charging ECU 40 (FIG. 1). In addition, inverter 102B can convert DC electric power received from inverter 104 to AC and output the AC electric power to power reception terminal 34.

Inverter 108C can also convert AC electric power received from insulating transformer 106 to DC and output the DC electric power to positive electrode line PL and negative electrode line NL in accordance with the signal from charging ECU 40. In addition, inverter 108C can convert DC electric power received from positive electrode line PL and negative electrode line NL to AC and output the AC electric power to insulating transformer 106.

In other words, this charger 32H allows bidirectional electric power conversion between power reception terminal 34 and positive and negative electrode lines PL and NL. Conductive charging during which the charging power is inputted from power reception terminal 34 and inductive charging (step-down type) using non-contact power reception unit 36A are possible, and electric power feeding from power reception terminal 34 to an electrical load external to the vehicle is also possible.

According to the ninth embodiment, the voltage conversion function (step-down type) at the time of inductive charging can be implemented with high efficiency and at low cost, in addition to the effect similar to that in the fourth embodiment. Furthermore, electric power feeding from power reception terminal 34 to the electrical load external to the vehicle is also possible.

Tenth Embodiment

Figure 14:
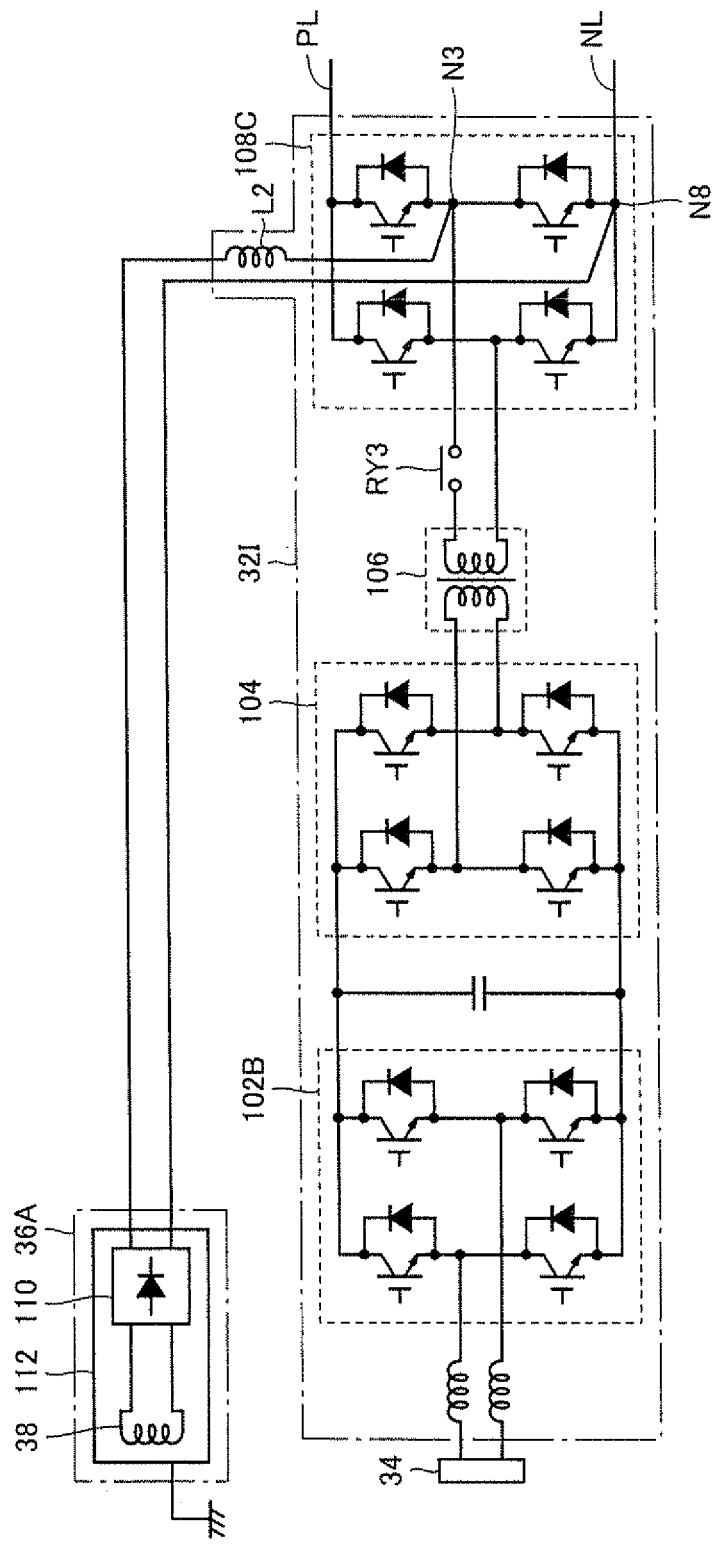
FIG. 14 shows a configuration of a charger in a tenth embodiment.

FIG. 14 shows a configuration of a charger 32I in a tenth embodiment. Referring to FIG. 14, charger 32I includes inverters 102E and 108C instead of rectification units 102A and 108B, respectively, in the configuration of charger 32E in the sixth embodiment as shown in FIG. 9. Inverters 102E and 108C are as described above.

This charger 32I also allows bidirectional electric power conversion between power reception terminal 34 and positive and negative electrode lines PL and NL. Conductive charging during which the charging power is inputted from power reception terminal 34 and inductive charging (step-up type) using non-contact power reception unit 36A are possible, and electric power feeding from power reception terminal 34 to the electrical load external to the vehicle is also possible.

According to the tenth embodiment, the voltage conversion function (step-up type) at the time of inductive charging can be implemented with high efficiency and at low cost, in addition to the effect similar to that in the fourth embodiment. Furthermore, electric power feeding from power reception terminal 34 to the electrical load external to the vehicle is also possible.

Figure 15:
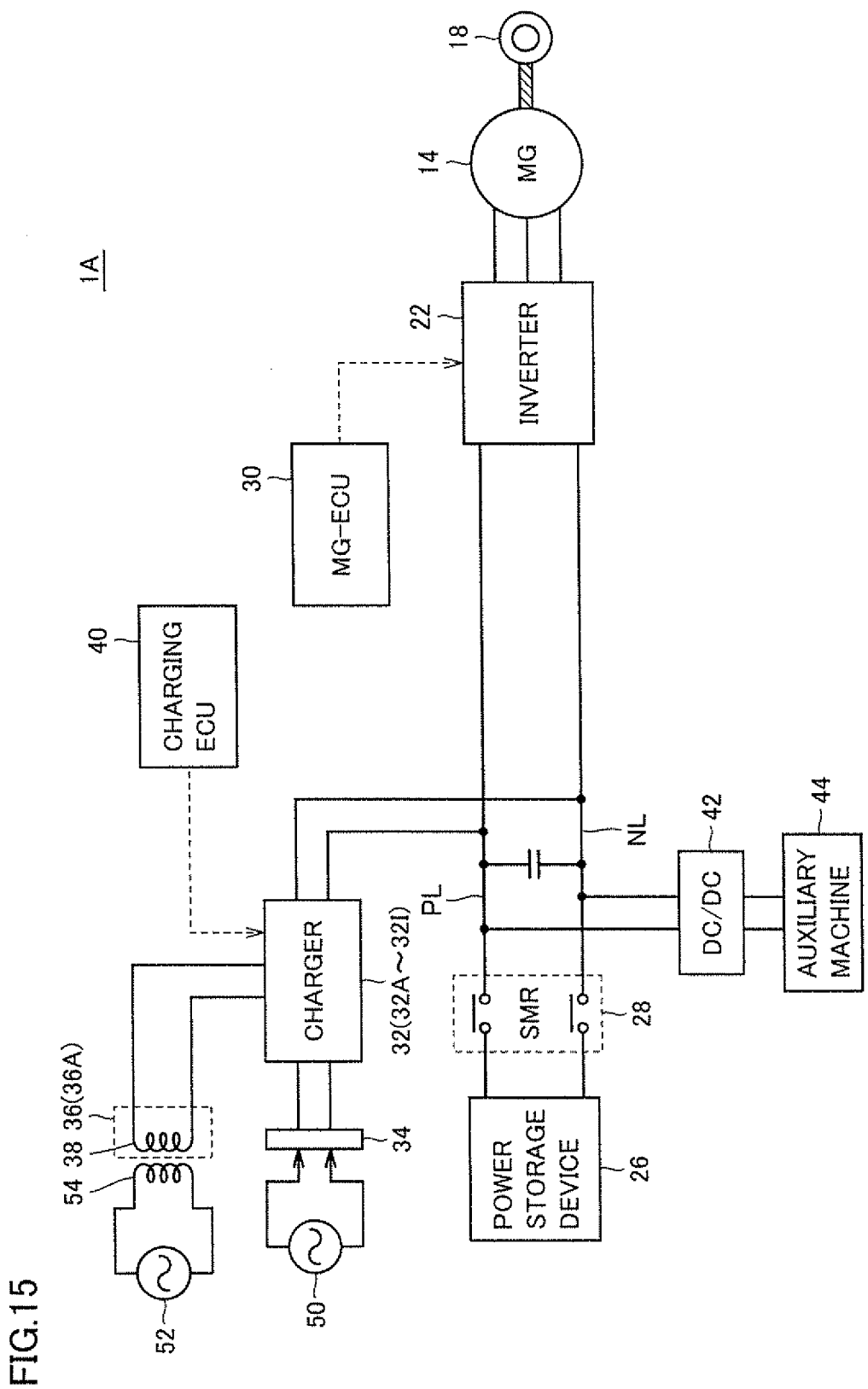
FIG. 15 is an overall configuration diagram of a vehicle that does not include a converter.

Although vehicle 1 includes converter 24, and charger 32 (32A to 32I) and DC/DC converter 42 are connected between converter 24 and system main relay (SMR) 28 in each of the above-mentioned embodiments, the present invention is also applicable to a vehicle 1A that does not include converter 24 as shown in FIG. 15.

In addition, the resonance method has been described in FIG. 3 as an example of a manner of power reception by non-contact power reception unit 36 or 36A in the above. The manner of power reception by non-contact power reception unit 36 or 36A is not, however, limited to the resonance method, but may be electromagnetic induction, for example.

Furthermore, non-contact power reception unit 36 (or 36A) is connected to the rectification unit having more excellent high-frequency rectification property, of the two rectification units included in the charger in each embodiment other than the fourth embodiment. The present invention is also applicable, however, to a charger including two rectification units having the same level of high-frequency rectification property.

In addition, the ninth and tenth embodiments in which electric power feeding from power reception terminal 34 to the electrical load external to the vehicle is possible correspond to the fifth and sixth embodiments, respectively. In the other embodiments as well, electric power feeding from power reception terminal 34 to the electrical load external to the vehicle becomes possible by replacing the rectification unit in the charger with the inverter.

In addition, although the charger is connected to positive electrode line PL and negative electrode line NL in each of the above-mentioned embodiments, the charger may be connected to main positive bus MPL and main negative bus MNL.

Although each of the above-mentioned embodiments has been described in connection with the series/parallel-type hybrid vehicle, as vehicle 1 (or 1A), capable of splitting the motive power of engine 10 by power split device 16 so that the motive power can be transmitted to driving wheel 18 and motor generator 12, the present invention is also applicable to hybrid vehicles of other types. Specifically, for example, the present invention is also applicable to vehicles such as a so-called series-type hybrid vehicle using only engine 10 for driving motor generator 12 and using only motor generator 14 for generating driving force for the vehicle, a hybrid vehicle recovering, as electrical energy, only the regenerative energy from the kinetic energy generated by engine 10, and a motor-assisted-type hybrid vehicle using an engine as a main motive power source and assisted by a motor as required.

In addition, the present invention is also applicable to an electric vehicle that does not include engine 10 and runs using electric power only, or a fuel cell vehicle further including a fuel cell as a DC power supply in addition to power storage device 26.

In the above, rectification units 102, 102A and 102B correspond to "first rectification unit" in the present invention, and rectification units 108, 108A to 108C correspond to "second rectification unit" in the present invention. In addition, transformer 109 corresponds to "voltage conversion device" in the present invention, and rectification unit 110 corresponds to "third rectification unit" in the present invention.

It should be understood that the embodiments disclosed herein are illustrative and not limitative in any respect. The scope of the present invention is defined by the terms of the claims, rather than the description of the embodiments above, and is intended to include any modifications within the scope and meaning equivalent to the terms of the claims.

REFERENCE SIGNS LIST 1, 1A vehicle; 10 engine; 12, 14 motor generator; 16 power split device; 18 driving wheel; 20, 22 inverter; 24 converter; 26 power storage device; 28 system main relay; 30 MG-ECU; 32, 32A to 32I charger; 34 power reception terminal; 36, 36A non-contact power reception unit; 38 power reception coil; 38-1 secondary self-resonant coil; 38-2 secondary coil; 40 charging ECU; 42 DC/DC converter; 44 auxiliary machine; 50, 52 AC power supply; 54 power transmission coil; 54-1 primary self-resonant coil; 54-2 primary coil; 56 load; 102, 102A, 108, 108A, 108B, 110 rectification unit; 104, 102B, 108C inverter; 106 insulating transformer; 109 transformer; 112 electromagnetic shielding material; PL positive electrode line; NL negative electrode line; MPL main positive bus; MNL main negative bus; RY1 to RY7 relay; N1 to N11 node; ARM upper and lower arms; L1, L2 reactor

The invention claimed is:

1. A vehicle charging apparatus for charging a power storage device mounted on a vehicle by an AC power supply external to the vehicle, comprising:
a power reception terminal configured to be electrically connectable to a first AC power supply;
a charger configured to convert AC electric power inputted from said power reception terminal to a predetermined DC voltage; and
a non-contact power reception unit configured to be magnetically coupled to a power transmission unit of a second AC power supply to receive electric power the second AC power supply in a non-contact manner,
said non-contact power reception unit being connected to a power conversion circuit of said charger.

2. The vehicle charging apparatus according to claim 1, wherein
said charger includes
a first rectification unit configured to be capable of rectifying the AC electric power inputted from said power reception terminal,
an inverter connected to said first rectification unit,
an insulating transformer connected to said inverter, and
a second rectification unit configured to rectify an output of said insulating transformer, and
said non-contact power reception unit is connected to either said first rectification unit or said second rectification unit.

3. The vehicle charging apparatus according to claim 2, wherein
one rectification unit of said first and second rectification units is formed of a rectification element having more excellent high-frequency rectification property than that of a rectification element constituting the other rectification unit, and
said non-contact power reception unit is connected to said one rectification unit.

4. The vehicle charging apparatus according to claim 2, wherein
said non-contact power reception unit is connected to said second rectification unit, and
said vehicle charging apparatus further comprises a voltage conversion device provided between said non-contact power reception unit and said second rectification unit.

5. The vehicle charging apparatus according to claim 1, wherein
said charger includes
a first rectification unit configured to be capable of rectifying the AC electric power inputted from said power reception terminal,
an inverter connected to said first rectification unit,
an insulating transformer connected to said inverter, and
a second rectification unit configured to rectify an output of said insulating transformer,
said non-contact power reception unit includes
a power reception coil configured to be magnetically coupled to a power transmission coil provided at said power transmission unit, and
a third rectification unit configured to rectify an output of said power reception coil, and
said third rectification unit is connected between said first rectification unit and said inverter.

6. The vehicle charging apparatus according to claim 1, wherein
said charger includes
a first rectification unit configured to be capable of rectifying the AC electric power inputted from said power reception terminal,
an inverter connected to said first rectification unit,
an insulating transformer connected to said inverter, and
a second rectification unit configured to rectify an output of said insulating transformer,
said non-contact power reception unit includes
a power reception coil configured to be magnetically coupled to a power transmission coil provided at said power transmission unit, and
a third rectification unit configured to rectify an output of said power reception coil,
said second rectification unit includes first and second upper-and-lower arms connected in parallel between a positive electrode output line and a negative electrode output line of said charger,
each arm of said first upper-and-lower arm includes a switching element, a secondary coil of said insulating transformer is connected between an intermediate point of said first upper-and-lower arm and an intermediate point of said second upper-and-lower arm, said charger further includes a reactor connected between the intermediate point of said first upper-and-lower arm and said positive electrode output line, and said third rectification unit is connected to the positive electrode output line and the negative electrode output line of said charger.

7. The vehicle charging apparatus according to claim 1, wherein said charger includes a first rectification unit configured to be capable of rectifying the AC electric power inputted from said power reception terminal, an inverter connected to said first rectification unit, an insulating transformer connected to said inverter, and a second rectification unit configured to rectify an output of said insulating transformer, said non-contact power reception unit includes a power reception coil configured to be magnetically coupled to a power transmission coil provided at said power transmission unit, and a third rectification unit configured to rectify an output of said power reception coil, said second rectification unit includes first and second upper-and-lower arms connected in parallel between a positive electrode output line and a negative electrode output line of said charger, each arm of said first upper-and-lower arm includes a switching element, a secondary coil of said insulating transformer is connected between an intermediate point of said first upper-and-lower arm and an intermediate point of said second upper-and-lower arm, said charger further includes a reactor connected between one output end of said third rectification unit and the intermediate point of said first upper-and-lower arm, and the other output end of said third rectification unit is connected to the negative electrode output line of said charger.

8. The vehicle charging apparatus according to claim 1, wherein said charger includes a first rectification unit configured to be capable of rectifying the AC electric power inputted from said power reception terminal, an inverter connected to said first rectification unit, an insulating transformer connected to said inverter, and a second rectification unit configured to rectify an output of said insulating transformer, said non-contact power reception unit includes a power reception coil configured to be magnetically coupled to a power transmission coil provided at said power transmission unit, and a third rectification unit configured to rectify an output of said power reception coil, said second rectification unit includes first and second upper-and-lower arms connected in parallel between a positive electrode output line and a negative electrode output line of said charger, each arm of said first upper-and-lower arm includes a switching element, a secondary coil of said insulating transformer is connected between an intermediate point of said first upper-and-lower arm and an intermediate point of said second upper-and-lower arm, said third rectification unit is connected to the positive electrode output line and the negative electrode output line of said charger, and said charger further includes a switching device for breaking electrical connection between the secondary coil of said insulating transformer and the intermediate point of said second upper-and-lower arm, and electrically connecting said secondary coil to said positive electrode output line, when said non-contact power reception unit is used for charging.

9. The vehicle charging apparatus according to claim 1, wherein said charger includes a first rectification unit configured to be capable of rectifying the AC electric power inputted from said power reception terminal, an inverter connected to said first rectification unit, an insulating transformer connected to said inverter, and a second rectification unit configured to rectify an output of said insulating transformer, said non-contact power reception unit includes a power reception coil configured to be magnetically coupled to a power transmission coil provided at said power transmission unit, and a third rectification unit configured to rectify an output of said power reception coil, said second rectification unit includes first and second upper-and-lower arms connected in parallel between a positive electrode output line and a negative electrode output line of said charger, each arm of said first upper-and-lower arm includes a switching element, a secondary coil of said insulating transformer is connected between an intermediate point of said first upper-and-lower arm and an intermediate point of said second upper-and-lower arm, said charger further includes a switching device for breaking electrical connection between the secondary coil of said insulating transformer and the intermediate point of said second upper-and-lower arm, and electrically connecting said secondary coil to one output end of said third rectification unit, when said non-contact power reception unit is used for charging, and the other output end of said third rectification unit is connected to the negative electrode output line of said charger.

10. The vehicle charging apparatus according to claim 5, wherein said non-contact power reception unit further includes an electromagnetic shielding material for integrally shielding said power reception coil and said third rectification unit from electromagnetic waves.

* * * * *